UNITED STATES PATENT OFFICE.

SIMON G. WIGHTMAN, OF WASHINGTON, DISTRICT OF COLUMBIA.

COMPOSITION OF MATTER.

No. 872,705.      Specification of Letters Patent.      Patented Dec. 3, 1907.

Application filed February 6, 1906. Serial No. 299,779.

*To all whom it may concern:*

Be it known that I, SIMON G. WIGHTMAN, a citizen of the United States, residing at Washington, in the District of Columbia, have invented certain new and useful Improvements in Compositions of Matter, of which the following is a specification.

This invention contemplates certain new and useful improvements in that class of compositions that are intended for paving streets, sidewalks, and the like, and it has particularly to do with certain improvements in the composition of matter for which Letters Patent of the United States were granted to Edward Wilde, on the seventeenth day of October, 1905, No. 801,951.

The patented composition is adaptable generally as a substitute for bricks, tile, natural stone, cement, and other materials and compounds for use in the construction of sewers, drains, cesspools, sea walls or levees, and numerous other analogous structures, and also as a substitute for the sheet and block asphalt heretofore commonly employed for paving. It is impermeable to water, is capable of withstanding considerable pressure or weight and abrasive wear, and is durable and of extreme hardness. This last characteristic, I have discovered, is present to such a marked degree, that the surface of the composition will not yield sufficiently to produce that slightly resilient surface or tread which paving should possess in order to meet all the requirements, although it is efficient in every other respect, owing to its cheapness, durability, and moisture and water proof properties.

It is, then, the object of my present invention, to utilize my discoveries in connection with the patented compound to produce an improved composition of matter peculiarly adapted for use in paving as a surface stratum, and especially in combination with the above mentioned patented compound as a base or sub-stratum, with which it forms a homogeneous structure, or monolithic integer.

The prior-patented compound or composition of matter is formed by combining resin and an iron oxid in the presence of heat, then incorporating therewith while still heated a finely divided earthy base, and finally compressing the mass before cooling and while still in a plastic condition to obtain the requisite density and texture and permitting the same to cool and harden. For a specific recital of the proportions of the ingredients and process steps employed, reference is to be particularly had to the schedule of the prior Letters Patent.

In connection with this compound, my present invention comprehends a surface dressing or stratum for paving consisting of an earthy base, resin, and asphaltum or coal tar. In the preferred method of producing the said surface stratum I heat, in any suitable vessel, the mixture of asphaltum and coal tar and a cheap resin in its natural state until they become a homogeneous plastic mass; I also take any of the common earths, such as clay, sand, gravel, loam, or a mixture thereof, and heat the same to a temperature of about 200 to 250 degrees Fahrenheit; I then add to this heated earthy base the mixture of resin and asphaltum or coal tar while such mixture is still heated and in its plastic condition and then effect the thorough commingling of all the ingredients by stirring or shoveling the same back and forth or by passing through a mixing machine. The resultant compound, while still in its plastic condition may be poured out and spread over a street to form the surface or tread thereof; it may be so poured over the surface of a street in which the intensely hard, durable, and impermeable prior patented compound has already been laid as a base or substratum; or it may be compressed and molded with the said patented compound to form paving blocks. In any of these instances it will be found to possess slightly resilient properties which render it very useful for the purpose described.

When my improved compound is spread upon or otherwise laid, in its plastic condition, upon the base compound formed of the earthy base, resin, and iron oxid, I have discovered (whether the base compound be heated or plastic at the time or otherwise) that the two compounds will form by cohesion a monolith or completely integral structure embodying an impenetrable, strong, and moisture-proof base and a durable top surface or surface stratum which is sufficiently resilient for the purpose for which it is intended. It will be found that pressure, such as can be applied by means of the ordinary street rolling implements, will be entirely adequate to effect the cohesion of the two strata to such a complete degree that they will only be distinguishable by a slight difference in color owing to the asphaltum or coal tar, and that no joints or cracks will exist between the two. The base, being absolutely impervious to water or moisture will protect the surface stratum from the effects of frost or the like.

The preferred proportions of the parts of the top or surface stratum of my invention are as follows:—common dirt, seventy-nine percent.; asphalt or black coal tar, seventeen per cent.; resin, four percent.

I claim as my invention:—

The herein-described monolithic structure, consisting of a base stratum formed by combining resin and an iron oxid in the presence of heat and then incorporating therewith while still heated a finely divided earthy base and finally compressing the mass before cooling while still in a plastic condition and a surface stratum combined therewith composed of an earthy base and a mixture of asphaltum and resin which is commingled with the earthy base while the latter is in a heated condition and the asphaltum and resin are in a heated and plastic condition, the surface stratum being applied to the base stratum while the former is heated, so that the heat thereof will draw up a certain amount of resin and iron from the base stratum, making a complete cohesion of the two strata.

In testimony whereof I affix my signature in presence of two witnesses.

SIMON G. WIGHTMAN. [L. S.]

Witnesses:
   FREDERICK S. STITT,
   J. D. YOAKLEY.